(12) United States Patent
Aguayo et al.

(10) Patent No.: US 12,647,427 B2
(45) Date of Patent: *Jun. 2, 2026

(54) CLASSIFYING A SOURCE OF A LOGIN ATTEMPT TO A USER ACCOUNT USING MACHINE LEARNING

(71) Applicant: Truist Bank, Charlotte, NC (US)

(72) Inventors: Joseph Aguayo, Fuquay Varina, NC (US); David Stone, Wake Forest, NC (US); Michael Lewis, Nashville, NC (US); Yasmin Martinez, Sugar Hill, GA (US); Doyoung Park, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/886,034

(22) Filed: Sep. 16, 2024

(65) Prior Publication Data

US 2025/0007919 A1      Jan. 2, 2025

Related U.S. Application Data

(63) Continuation of application No. 17/710,043, filed on Mar. 31, 2022, now Pat. No. 12,120,126.

(51) Int. Cl.
H04L 9/40 (2022.01)
G06N 5/022 (2023.01)

(52) U.S. Cl.
CPC ........... H04L 63/105 (2013.01); G06N 5/022 (2013.01); H04L 63/083 (2013.01)

(58) Field of Classification Search
CPC ...... H04L 63/105; H04L 63/083; G06N 5/022

USPC .............................................................. 726/4
See application file for complete search history.

(56) References Cited

U.S. PATENT DOCUMENTS

| | | | |
|---|---|---|---|
| 8,590,018 B2 * | 11/2013 | Thavasi ................... | G06F 21/31 726/28 |
| 9,185,095 B1 * | 11/2015 | Moritz ................ | H04L 63/0861 |
| 9,237,146 B1 * | 1/2016 | Casillas ................ | G06F 21/335 |
| 10,972,475 B1 * | 4/2021 | Zaki ....................... | G06F 21/604 |
| 11,455,641 B1 * | 9/2022 | Shahidzadeh ......... | H04L 67/306 |
| 11,671,424 B2 * | 6/2023 | Margolin ................. | G06N 3/08 726/4 |
| 2013/0104203 A1 * | 4/2013 | Davis .................... | H04L 9/3263 726/5 |

(Continued)

*Primary Examiner* — Thanh T Le
(74) *Attorney, Agent, or Firm* — Kilpatrick Townsend & Stockton LLP; Michael A. Springs, Esq.

(57) ABSTRACT

A source of a login attempt to a user account can be classified using machine learning. For example, a computing system can input user activity observations associated with one or more login attempts to one or more user accounts into a trained machine learning model. One or more distinguishing factors for the one or more login attempts can be received from the trained machine learning model. The computing system can determine a source of a current login attempt by applying a clustering algorithm to current values of the one or more distinguishing factors. The current values may be derived from current user activity observations associated with the current login attempt. The computing system can determine an authentication level for the current login attempt to the user account based on the source of the current login attempt.

18 Claims, 3 Drawing Sheets

100

(56) References Cited

U.S. PATENT DOCUMENTS

| | | | |
|---|---|---|---|
| 2013/0160087 A1* | 6/2013 | Davis | H04L 63/10 |
| | | | 726/4 |
| 2015/0373039 A1* | 12/2015 | Wang | H04L 63/1425 |
| | | | 726/23 |
| 2016/0057623 A1* | 2/2016 | Dutt | H04W 12/126 |
| | | | 455/411 |
| 2018/0007553 A1* | 1/2018 | Dutt | H04L 63/0861 |
| 2019/0019363 A1* | 1/2019 | Zellner | H04L 63/20 |
| 2019/0236249 A1* | 8/2019 | Pavlou | G06F 21/554 |
| 2019/0334903 A1* | 10/2019 | Lerner | H04L 63/10 |
| 2020/0045044 A1* | 2/2020 | Turgeman | G06F 3/03543 |
| 2020/0162255 A1* | 5/2020 | Hunt | H04L 63/083 |
| 2020/0195693 A1* | 6/2020 | Price | G06F 21/552 |
| 2020/0244639 A1* | 7/2020 | Arif Khan | G06N 3/0499 |
| 2020/0293638 A1* | 9/2020 | Rose | G06F 21/316 |
| 2021/0319527 A1* | 10/2021 | Benkreira | G06N 3/0464 |
| 2022/0272083 A1* | 8/2022 | Rule | H04L 9/3242 |
| 2022/0286451 A1* | 9/2022 | Tokuyama | H04L 63/105 |
| 2022/0286476 A1* | 9/2022 | Carroll | H04L 63/1425 |

* cited by examiner

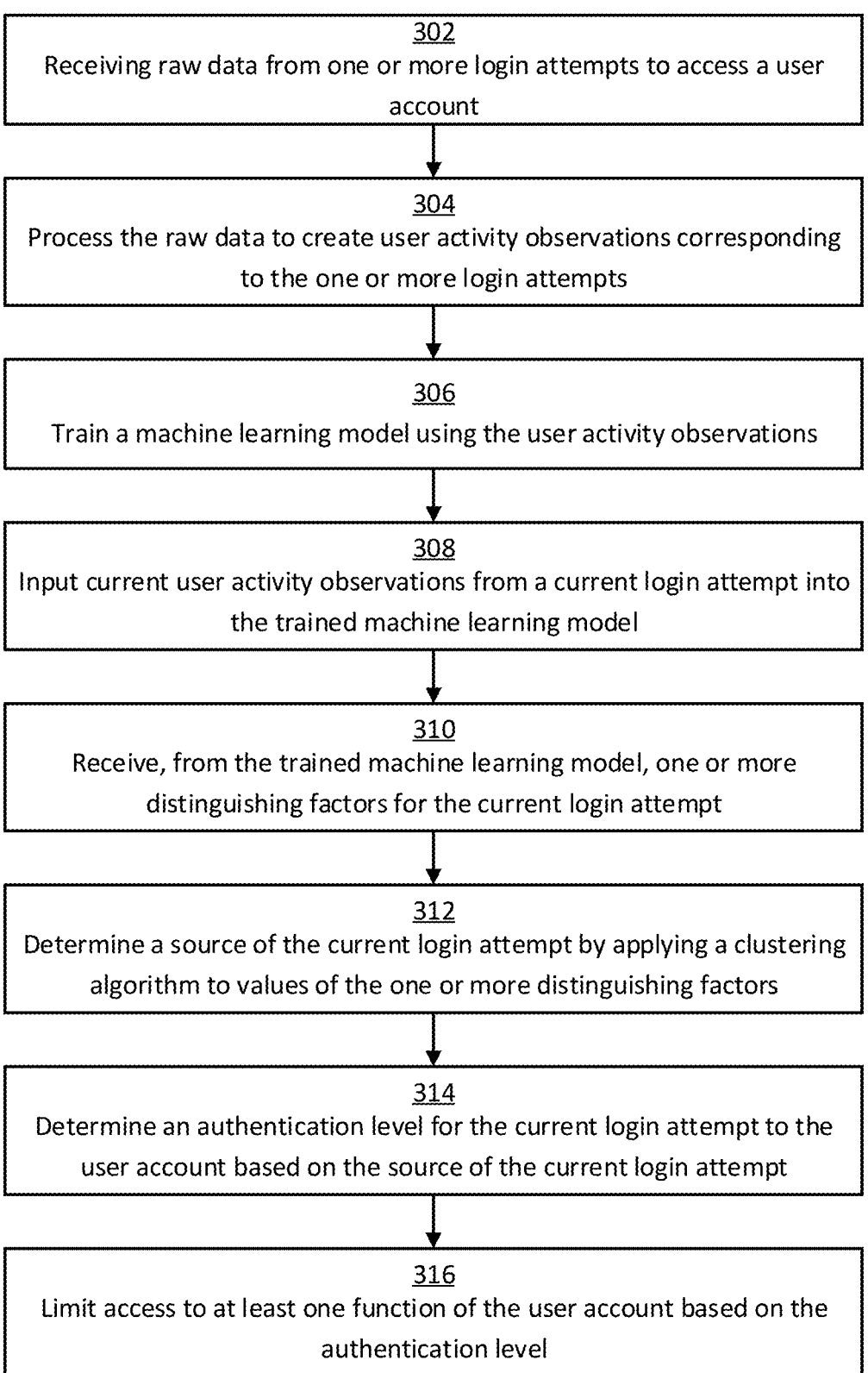

302
Receiving raw data from one or more login attempts to access a user account

304
Process the raw data to create user activity observations corresponding to the one or more login attempts

306
Train a machine learning model using the user activity observations

308
Input current user activity observations from a current login attempt into the trained machine learning model

310
Receive, from the trained machine learning model, one or more distinguishing factors for the current login attempt

312
Determine a source of the current login attempt by applying a clustering algorithm to values of the one or more distinguishing factors

314
Determine an authentication level for the current login attempt to the user account based on the source of the current login attempt

316
Limit access to at least one function of the user account based on the authentication level

FIG. 3

CLASSIFYING A SOURCE OF A LOGIN ATTEMPT TO A USER ACCOUNT USING MACHINE LEARNING

CROSS-REFERENCE TO RELATED APPLICATIONS

This application is a continuation of U.S. patent application Ser. No. 17/710,043, filed Mar. 31, 2022, titled "CLASSIFYING A SOURCE OF A LOGIN ATTEMPT TO A USER ACCOUNT USING MACHINE LEARNING", the entirety of which is incorporated herein by reference.

TECHNICAL FIELD

The present disclosure relates to online authentication. More specifically, but not by way of limitation, this disclosure relates to classifying a source of a login attempt to a user account using machine learning.

BACKGROUND

Online and mobile banking applications can allow users to interact with a financial institution's products and services by accessing their user account. In many examples, a human user can log into their user account using valid account credentials to perform functions such as checking fund balances or sending payments. The human user may be an individual customer, a small business owner, or a corporate officer in a larger company. In some situations, the user account may be accessed by third parties other than the human user associated with the user account. For example, the human user may provide a third party financial aggregator with the valid account credentials. The financial aggregator may periodically access the user account to download a transaction history for accounting or budget purposes. In some cases, the financial aggregator may execute an automated bot to automatically login to the user account at predefined intervals, download the desired data, and process it for delivery to the user or an authorized third party. In other examples, an unauthorized user may access the user account using the valid account credentials. For example, cyber criminals may acquire leaked account credentials, such as usernames, email addresses, and passwords, from data breaches of different accounts. The cyber criminals may use the leaked account credentials to attempt to access user accounts for human users that have re-used the same account credentials for multiple accounts.

SUMMARY

In one example, a system includes a processor and a non-transitory computer readable memory. The non-transitory computer-readable memory includes instructions that are executable by the processor to cause the processor to perform operations. The processor can input user activity observations associated with one or more login attempts to one or more user accounts into a trained machine learning model. The processor can receive, from the trained machine learning model, one or more distinguishing factors for the one or more login attempts. The processor can determine a source of a current login attempt by applying a clustering algorithm to current values of the one or more distinguishing factors. The current values can be derived from current user activity observations associated with the current login attempt. The processor can determine an authentication level for the current login attempt to the user account based on the source of the current login attempt.

In another example, a method includes inputting, by a processor, user activity observations associated with one or more login attempts to one or more user accounts into a trained machine learning model. The method also includes receiving, from the trained machine learning model, one or more distinguishing factors for the one or more login attempts. The method also includes determining a source of a current login attempt by applying a clustering algorithm to current values of the one or more distinguishing factors. The current values can be derived from current user activity observations with the current login attempt. The method also includes determining an authentication level for the current login attempt to the user account based on the source of the current login attempt.

In a further example, a non-transitory computer-readable medium having program code stored thereon that is executable by a processor to perform operations. The operations include inputting user activity observations associated with one or more login attempts into a trained machine learning model. The operations also include receiving, from the trained machine learning model, one or more distinguishing factors for the one or more login attempts. The operations also include determining a source of a current login attempt by applying a clustering algorithm to current values of the one or more distinguishing factors. The current values can be derived from current user activity observations associated with the current login attempt. The operations also include determining an authentication level for the current login attempt to the user account based on the source of the current login attempt.

BRIEF DESCRIPTION OF THE DRAWINGS

FIG. 3 is a flowchart of an example of a process for classifying a source of a current login attempt to a user account using machine learning according to some aspects of the present disclosure.

DETAILED DESCRIPTION

Figure 1:
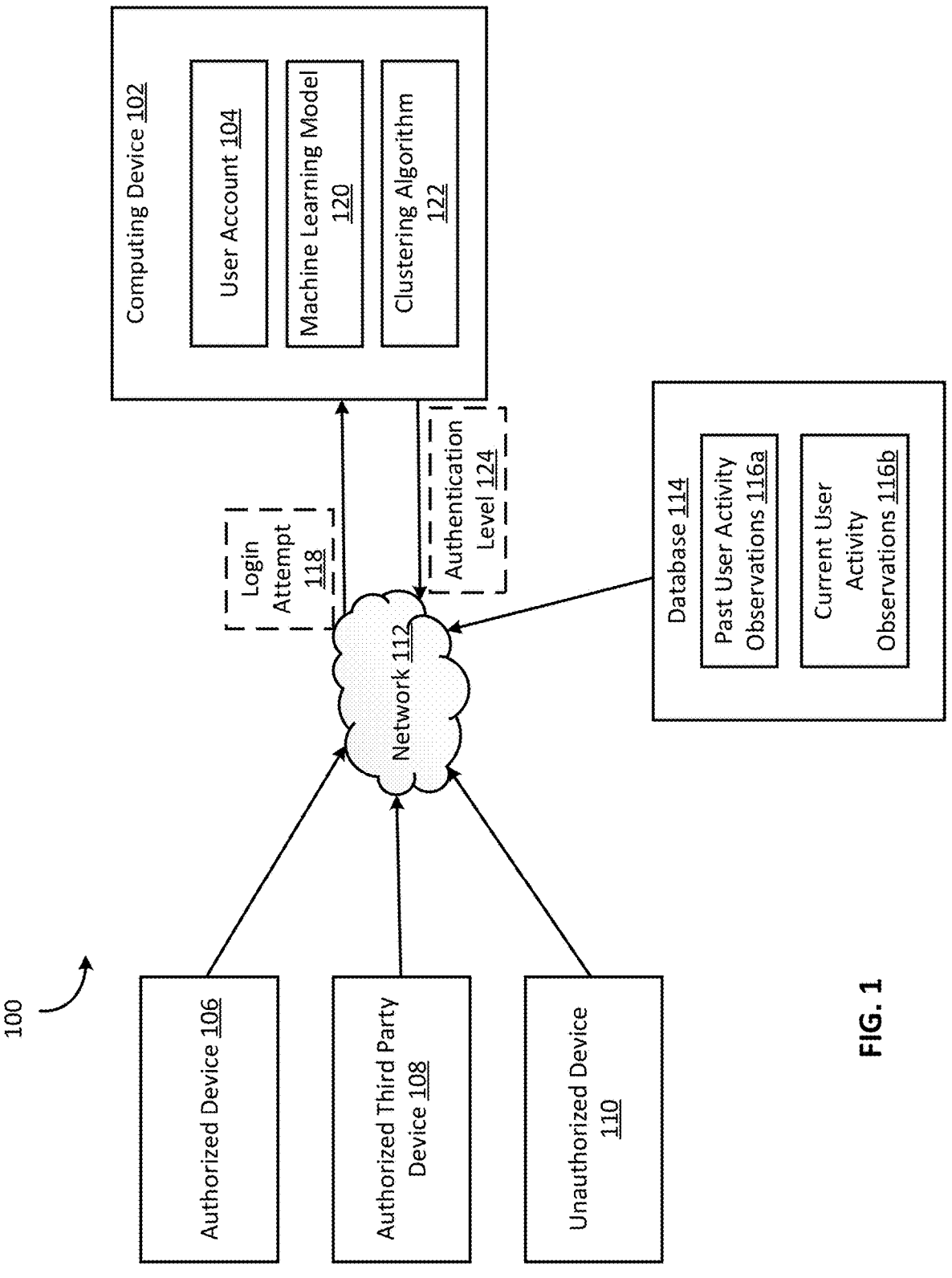
FIG. 1 is a block diagram of an example of a network environment usable to classify a source of a current login attempt to a user account using machine learning according to some aspects of the present disclosure.

Certain aspects and features relate to classifying a source of a login attempt to a user account using machine learning. It may be beneficial to restrict or deny access to a user account of an application, such as an online or mobile banking application, based on the source of the login attempt. A login attempt may be attempted by various authorized sources, third party sources, or unauthorized sources. For example, an authorized source may be a human user (e.g., owner) associated with the user account, who may want full permissions to interact with the application. An authorized source may also be a third party source that can have limited permissions to interact with the application. For example, an authorized third party source may be a financial aggregator that has been given valid account credentials, such as by the human user, to periodically login to the user account to access certain functions of the application. An example of an unauthorized source can include a cyber-attack, such as a botnet hacking attempt in which cyber criminals orchestrate distributed attacks from numerous locations around the world. Because these attacks are launched from different device types and IP addresses, it can be difficult to detect and block access from such unauthorized sources using traditional cybersecurity techniques. Because authorized users, authorized third party users, and unauthorized users may access the user account using valid account credentials, it may be difficult to determine a level of user account access to provide to a source of a successful login attempt.

Some aspects of the present disclosure may overcome one or more of the abovementioned problems by inputting user activity observations from a current login attempt to a machine learning model that has been trained with prior user activity observations collected during previous login attempts for the user account. The trained machine learning model can output one or more distinguishing factors for the current login attempt. The distinguishing factors can be factors that cause significant variance within the user activity observations. A clustering algorithm can then be applied to the distinguishing factors to determine a source of the current login attempt. Based on the source, full access, limited access, or no access may be granted to the source of the current login attempt. For example, a financial institution may block access to a user account of a banking application from a device determined to be unauthorized. The financial institution may also allow restricted access, such as permission to view but not engage in financial transactions, to devices determined to be authorized third party devices. Alternatively, the financial institution may allow full access to the user account to devices determined to be authorized devices operated by the human user of the user account.

In one particular example, user activity observations for login attempts to access a user account can be collected and stored by a computing environment. The user activity observations can be collected for successful and unsuccessful login attempts. In some examples, the user activity observations can include coordinates with timestamps for user input, such as touch screen movement and cursor movement. The user activity observations can also include device information, network information, and any other characteristics relating to the login attempt. A machine learning model can be trained using the user activity observations. After receiving a current login attempt from an unknown source, current user activity observations from the current login attempt can be inputted into the trained machine learning model. The trained machine learning model can apply an algorithm to the current user activity observations. For example, the algorithm can be a principal component analysis algorithm that is used to encode the current user activity observations to determine one or more distinguishing factors within the current activity observations with the highest variance.

The computing environment can determine a source of the current login attempt by applying a clustering algorithm to the one or more distinguishing factors. The clustering algorithm may classify the source into one of at least three clusters. The clusters can include a first cluster for authorized devices, a second cluster for unauthorized devices, and a third cluster for authorized third party devices. The clustering algorithm may be used to determine that the distinguishing factors for the current login attempt are most closely aligned with distinguishing factors for previous login attempts in a particular cluster. After classifying the source into a particular cluster, the computing environment may determine an authentication level for the source before providing access to the user account. For example, each cluster may have a preassigned authentication level. So, the computing environment can determine which authentication level is assigned to the cluster into which the source was classified. The computing environment may then allow or limit access to at least one function of the user account based on the authentication level. In some examples, the computing environment may provide no access or full access to the user account depending on the classified source.

These illustrative examples are given to introduce the reader to the general subject matter discussed here and are not intended to limit the scope of the disclosed concepts. The following sections describe various additional features and examples with reference to the drawings in which like numerals indicate like elements.

FIG. 1 is a block diagram of an example of a network environment 100 usable to classify a source of a current login attempt 118 to a user account 104 using machine learning according to some aspects of the present disclosure. Each communication within the network environment 100 may occur over one or more data networks, such as a public data network, a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN").

A computing device 102 can be communicatively coupled to a database 114 through the network 112. The computing device 102 can implement one or more applications that can be used by multiple users to access user account information and perform application functions related to multiple user accounts 104. The database 114 can store any information necessary for the computing device 102 to implement any functions of an application in relation to user account 104 access and permissions. In some examples, the computing device 102 and the database 114 can be a single computing device that implements an application and stores user account information. The computing device 102 and the database 114 can be operated and maintained by one or more entities implementing the applications that control access to the user accounts 104.

The network environment 100 can include various devices that can transmit login attempts 118 via the network 112 for accessing the user account 104. For example, the network environment 100 can include an authorized device 106, an authorized third party device 108, and an unauthorized device 110. Examples of devices used for login attempts 118 can include desktop computers, videogame consoles, mobile phones (e.g., cellular phones), PDAs, tablet computers, net books, laptop computers, hand-held specialized readers, and wearing devices such as smart watches.

An authorized device 106 can be a device operated by an authorized user, such as the human user (e.g., the account owner) associated with the user account 104. The authorized user may operate the authorized device 106 to transmit a login attempt 118 to the computing device 102 to gain access to account data and perform account functions through an application implemented by the database 114 or the computing device 102.

An authorized third party device 108 can be a device operated by a third party (e.g., a party other than the account owner and the entity hosting the user account 104) that is authorized to access the user account 104. An example of an authorized third party device 108 can include a financial aggregator that can obtain and aggregate financial data associated with the user account 104 from the entity hosting the user account 104. Financial aggregators may operate on behalf of, and at the request of, the owner of the user account 104. For example, the owner or another authorized user of the account 104 may provide their login credentials to the financial aggregator to allow the financial aggregator to access the user account 104. Examples of financial aggregators can include Intuit® or Mint®. The financial aggregator can access the user account 104 periodically by transmitting a login attempt 118 with the valid account credentials provided by the authorized user. For example, the financial aggregator may execute an automated bot to download and process a transaction history from the user account 104 at predetermined time intervals, such as once per day.

Unauthorized devices 110 can refer to devices that are operated by unauthorized users (e.g., hackers or automated hacking programs) to attempt to gain access to accounts corresponding to other people or entities. In some examples, the unauthorized device 110 may include multiple unauthorized devices 110 located in numerous locations around the world and linked together to perform botnet attacks. The multiple linked unauthorized devices 110 may repeatedly transmit login attempts 118 from varying device types and IP addresses.

User activity observations 116 for each successful and unsuccessful login attempt 118 transmitted by the authorized device 106, authorized third party device 108, unauthorized device 110, or any other kind of device may be stored in the database 114. User activity observations 116 can include network information, browser settings used in the login attempt 118, device information such as IP address, etc. User activity observations 116 can also include input data, such as from cursor movements or touch screen movements. The input data can include coordinate locations and timestamps, which may be processed to determine other input characteristics such as input location data, input time data, input velocity, input acceleration, and input movement frequency. In the context of cursor movements, the input characteristics may include cursor locations, cursor velocities, cursor accelerations, frequencies of cursor movements, etc. In some examples, the input data can be processed to determine patterns, such as patterns in cursor movements or touch screen movements and keyboard typing patterns. These patterns may be useful in distinguishing authorized devices, authorized third party devices, and unauthorized devices from one another, as these devices may have different patterns of operation. In some examples, the user activity observations 116 can include heat maps or keystroke logs, which may be received from devices such as from the authorized third party device 108 or generated based on other user activity observations 116.

The computing device 102 includes a machine learning model 120 that can be trained using the user activity observations 116 from past login attempts 118. The machine learning model 120 may be trained using processed or unprocessed user activity observations 116. In some examples, the machine learning model 120 may be trained with user activity observations 116 that are simulated to mirror login attempts 118 from an unauthorized device 110. For example, a botnet attack may typically include unusual user activity behavior that can be impossible or unlikely for a human user to perform. So, a simulated user activity observation 116 may include input data with relatively instantaneous cursor movement between non-adjacent coordinates, or high numbers of login attempts 118 to different user accounts 104 from the same device within a certain time period.

After the machine learning model 120 is trained, a login attempt 118 may be received from an unknown source. Current user activity observations 116b from the current login attempt 118 may be inputted into the trained machine learning model 120. The trained machine learning model 120 may process the current user activity observations 116b using an algorithm, such as a principal component analysis ("PCA") algorithm. In some examples, other algorithms may be used such as a random forest algorithm. The machine learning model 120 can determine which factors within the current user activity observations 116b cause the most variance. The machine learning model 120 can output the determined factors. These factors can be referred to as distinguishing factors, since they can help distinguish among various sources of login attempts. The values for the distinguishing factors can then be input into a clustering algorithm 122, which can classify a source of the current login attempt 118 into a cluster among a group of predefined clusters based on the values for the distinguishing factors. For example, the clustering algorithm 122 can determine whether the login attempt 118 falls into a first cluster for authorized devices 106, a second cluster for unauthorized devices 110, and a third cluster for authorized third party devices 108.

Based on the determined source of the current login attempt 118, the computing device 102 may determine an authentication level for the current login attempt 118. For example, the computing device 102 may determine if the source will have full access, partial access with restrictions, or no access to the user account 104. If the source is determined to be an authorized device 106, the authorized device 106 may have full, unrestricted access to all functions of the user account 104. For example, the authorized device 106 may transmit funds, apply for credit, and check fund balances. If the source is determined to be an unauthorized device 110, the unauthorized device 110 may be blocked from accessing the user account 104. If the source is determined to be an authorized third party device 108, the authorized third party device 108 may have limited access to the user account 104. For example, the authorized third party device 108 may download transaction histories, but may not transmit funds or apply for credit. In some examples, the trained machine learning model 120 may be updated using the current login attempt 118 and corresponding current user activity observations 116b, along with the clustering result and determined authentication level. In this way, the machine learning model 120 can continue to be trained over time.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the computing device 102 and the database 114, may instead be implemented in a single device or system.

Figure 2:
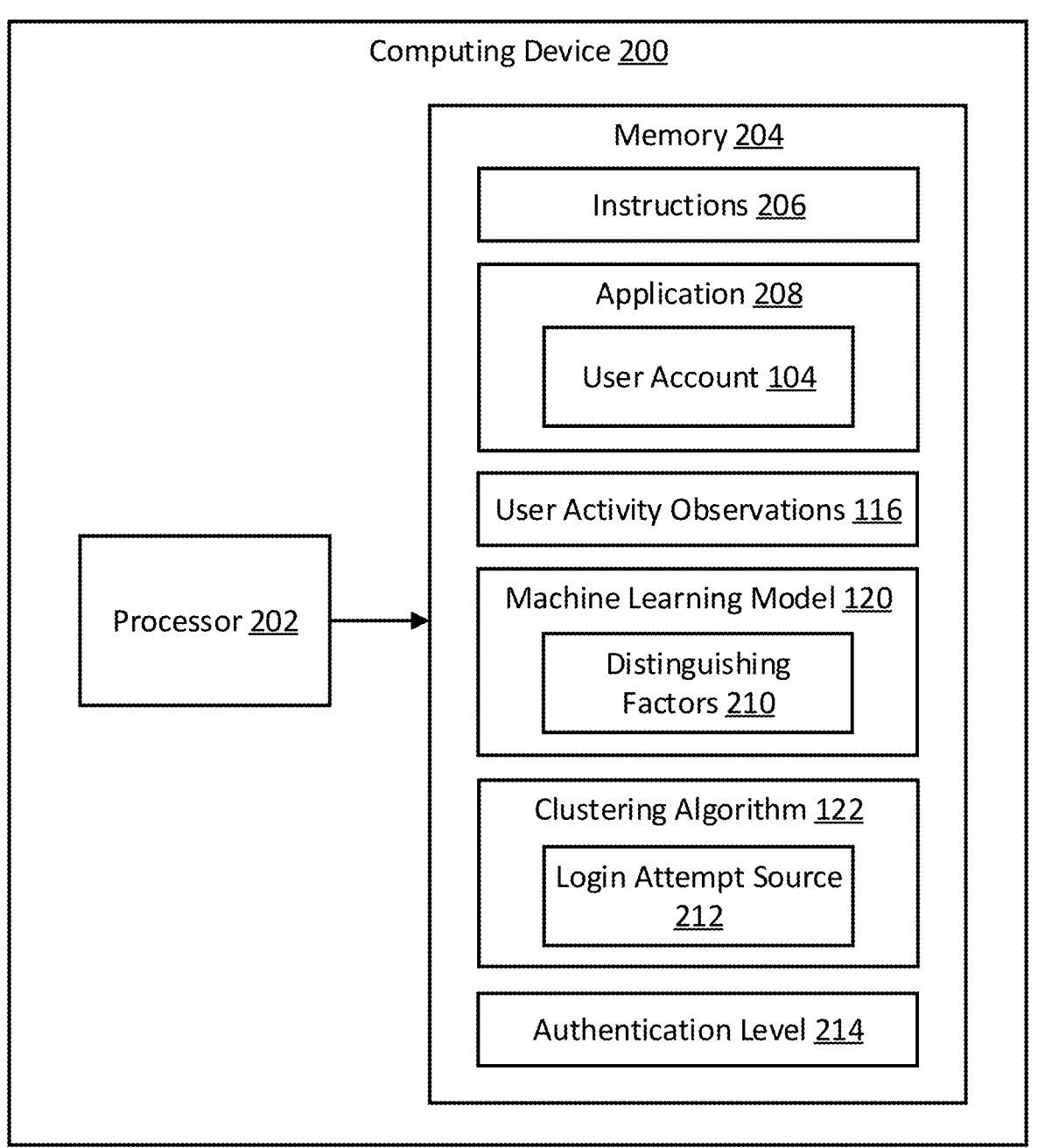
FIG. 2 is a block diagram of an example of a computing device for classifying a source of a current login attempt to a user account using machine learning according to some aspects of the present disclosure.

FIG. 2 is a block diagram of an example of a computing device 200 for classifying a source of a current login attempt to a user account 104 using machine learning according to some aspects of the present disclosure. For example, the computing device 200 may be used as the computing device 102 from FIG. 1. The computing device 200 can include a processor 202 and a memory 204. In some examples, the components shown in FIG. 2 can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions 206 stored in the memory 204 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 can be communicatively coupled to the memory 204. The non-volatile memory 204 may include any type of memory device that retains stored information when powered off. Non-limiting examples of the memory 204 include electrically erasable and programmable read-only memory ("EEPROM"), flash memory, or any other type of non-volatile memory. In some examples, at least some of the memory 204 can include a medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 204 can include an application 208 that can be used to access data and perform functions, such as transferring information or funds between accounts. A user may access the application 208 via their user account 104. The memory 204 can also include user activity observations 116 collected from previous login attempts 118. Also included in the memory 204 is a machine learning model 120 that can be trained using the user activity observations 116. The processor 202 can execute instructions 206 to input current user activity observations 116b from a current login attempt to the trained machine learning model 120. The trained machine learning model 120 may output one or more distinguishing factors 210 that differentiate between different login attempt sources 212. The processor 202 may apply a clustering algorithm 122 to values of the distinguishing factors 210 to determine a login attempt source 212. For example, the clustering algorithm 122 may classify the login attempt source 212 as an authorized device 106, an authorized third party device 108, or an unauthorized device 110. In some examples, the processor 202 may determine an authentication level 214 for the current login attempt to the user account 104 based on the login attempt source 212.

FIG. 3 is a flow chart of an example of a process for classifying a source 212 of a current login attempt 118 to a user account 104 using machine learning according to some aspects of the present disclosure. The process of FIG. 3 can be implemented by the network environment 100 of FIG. 1 or the computing device 200 of FIG. 2, but other implementations are also possible.

In block 302, the processor 202 can receive raw data from one or more login attempts 118 to access a user account 104. In some examples, the raw data may include cursor movements performed by a user of a device while performing the login attempt 118. Additionally or alternatively, the raw data may include locations tapped by a user of a device with a touch screen while performing the login attempt 118. The raw data can include multiple data rows including input location data and input time data. The input location data can include coordinate values (e.g., an "x" coordinate and a "y" coordinate) for each cursor location or tapped location, and the input time data can be a timestamp capturing when the cursor position or tap occurred. The more the cursor was moved by the user of the device, the more data rows may be received by the processor 202.

In some examples, the raw data may include keystroke logs identifying the keys typed during login attempts 118, along with a timestamp capturing when each key was typed. In other examples, the raw data may include heat maps that track cursor movements or tapped locations on touch screens. Additionally or alternatively, the raw data may include device information such as IP address, geographical location, and type of device, along with network information and any other information relating to login attempts 118.

In block 304, the processor 202 can process the raw data to create user activity observations 116 corresponding to the one or more login attempts 118. For example, raw data such as input location data, input time data, and keystrokes can be used to determine input velocity, input acceleration, input movement frequency, login attempt duration, and number of login attempts. Other information may also be derived from the raw data and used as part of the user activity observations 116.

In block 306, the processor 202 can train a machine learning model 120 using the user activity observations 116. The user activity observations 116 can include processed raw data, along with unprocessed raw data. The processor 202 may train the machine learning model 120 using supervised or unsupervised training techniques. Examples of the machine learning model 120 can include a neural network, decision tree, classifier, or combinations thereof. In some examples, the machine learning model may employ principal component analysis (PCA) as a dimensionality reduction technique to process the user activity observations 116, which may be a relatively large dataset.

In block 308, the processor 202 can input current user activity observations 116b from a current login attempt 118 into the trained machine learning model 120. The current login attempt 118 may be received from an unknown source. The trained machine learning model 120 can include an algorithm, such as a PCA, for determining one or more distinguishing factors 210 for the current login attempt 118. For example, the trained machine learning model 120 may use the PCA to encode the current user activity observations 116b into factors and to determine which factors create the most variance within the current user activity observations 116b.

In block 310, the processor 202 can receive the one or more distinguishing factors 210 from the trained machine learning model 120. In some examples, the processor 202 may receive two or more distinguishing factors 210 from the trained machine learning model 120.

In block 312, the processor 202 can determine a source 212 of the current login attempt 118 by applying a clustering algorithm 122 to values of the distinguishing factors 210. The processor 202 can use the clustering algorithm 122 to classify the current login attempt 118 into one of at least three clusters based on the values of the distinguishing factors 210. For example, the clustering algorithm 122 can classify the current login attempt 118 into a first cluster for authorized devices 106 based on the value of the distinguishing factors 210 aligning with values of distinguishing factors determined for previous login attempts 118 from authorized devices 106. The clustering algorithm 122 can also classify the current login attempt 118 into a second cluster for unauthorized devices 110 or a third cluster for authorized third party devices 108.

In some examples, the clusters may include sub-clusters to further identify the source 212. For example, each authorized third party device 108 can have unique user activity observations 116 that are reflected in the values of the distinguishing factors 210. Therefore, the clustering algorithm 122 may classify the current login attempt 118 as belonging to the third cluster for authorized third party devices 108, and may additionally classify the current login attempt 118 into a subpart of the third cluster belonging to a particular financial aggregator such as Mint. As another example, the clustering algorithm 122 may classify the current login attempt 118 as belonging to the second cluster for unauthorized devices 110, and may additionally classify the current login attempt 118 into a subpart of the second cluster belonging to a botnet attack.

In block 314, the processor 202 can determine an authentication level 214 for the current login attempt 118 to the user account 104 based on the source 212 of the current login attempt 118. Different sources 212 can have different authentication levels 214. For example, a source 212 identified as an authorized device 106 may be determined to have a relatively high authentication level 214, which may allow the authorized device 106 full access to the functions of the user account 104. In some examples, a source 212 identified as an authorized third party device 108 may be determined to have an authentication level 214 that is relatively lower than the authentication level 214 for an authorized device 106. The authentication level 214 may correspond to reduced access (e.g., view only access) to the user account 104. In another example, a source identified as an unauthorized device 110 may be determined to have a relatively low authentication level 214, which may be used to limit or entirely prevent the unauthorized device 110 from accessing the user account 104.

In some examples, the authentication level 214 may be determined using the results of the clustering algorithm 122 combined with additional factors. For example, if the source 212 is an authorized device 106, the processor 202 may compare the current user activity observations 116b to past user activity observations 116a from previous login attempts 118 made by the authorized device 106. If the current user activity observations 116b differ from the past user activity observations 116a in a predetermined way (e.g., determined by computing and comparing one or more predetermined metrics associated with the current and past user activity observations), the authentication level 214 may be reduced. The authentication level 214 for a source 212 determined to be an authorized third party device 108 may be determined in the same manner. Additionally, particular authorized third party devices 108 may be determined to have differing authentication levels. For example, the processor 202 may assign a first financial aggregator a higher authentication level than a second financial aggregator based on predetermined rules.

In block 316, the processor 202 can limit access to at least one function of the user account 104 based on the authentication level 214. In some examples, the processor 202 may determine the limited access to at least one function by applying predefined rules. The predefined rules may define which functions are to be limited for particular authentication levels. For example, the processor 202 may prevent an authorized third party device 108 that is a first financial aggregator with a first authentication level from accessing funds based on a first predefined rule. The processor 202 may only allow the first financial aggregator to download information (e.g., transaction histories) for a checking account and a savings account. In another login attempt 118 by an authorized third party device 108 that is a second financial aggregator with a second authentication level that is lower than the first authentication level, the processor 202 may only allow the second financial aggregator to download information for the checking account, and may prevent the second financial aggregator from accessing information for the savings account based on a second predefined rule.

In another example, the processor 202 may limit access to all functions of the user account 104 for an unauthorized device 110 based on a relatively low authentication level 214. Additionally or alternatively, the processor 202 may require additional authentication measures for the unauthorized device 110 or any other device before allowing access to the user account 104. For example, the additional authentication measures may include two-factor authentication or a password reset. User accounts 104 that are identified as being subject to a hacking attempt by one or more unauthorized devices 110 may be temporarily disabled.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A system comprising:
   a processor; and
   a non-transitory computer-readable memory comprising instructions executable by the processor for causing the processor to:
   input, into a trained machine learning model, current user activity observations associated with a current login attempt to a user account, wherein the trained machine learning model comprises a principal component analysis algorithm;
   receive, from the trained machine learning model, one or more distinguishing factors for the current login attempt, wherein the principal component analysis algorithm is configured to determine the one or more distinguishing factors based on variance within the current user activity observations;
   provide values of the one or more distinguishing factors as input to a clustering algorithm that is separate from the trained machine learning model, wherein the clustering algorithm is configured to generate an output classifying a source of the current login attempt into one of at least three clusters based on the input, and wherein each cluster of the at least three clusters indicates a different source than other clusters in the at least three clusters;
   receive, from the clustering algorithm, the output indicating a classification of the source of the current login attempt into a particular cluster of the at least three clusters;
   determine, from among a plurality of authentication levels, an authentication level to assign to the current login attempt based on the classification of the source of the current login attempt into the particular cluster, wherein each authentication level of the plurality of authentication levels is associated with a respective cluster of the at least three clusters, and wherein each authentication level of the plurality of authentication levels confers a respective level of access to the user account that is different than other authentication levels of the plurality of authentication levels; and re-train the trained machine learning model using the output classification of the source of the current login attempt, the authentication level for the current login attempt, and the current user activity observations.

2. The system of claim 1, wherein the current user activity observations comprise one or more of input location data, input time data, input velocity, input acceleration, input movement frequency, login attempt duration, number of login attempts, and IP address.

3. The system of claim 1, wherein the current user activity observations comprise heat maps of input location data and keystroke logs for keyboard input.

4. The system of claim 1, wherein the non-transitory computer-readable memory further comprises instructions that are executable by the processor for causing the processor to:

limit access to at least one function of the user account based on the authentication level.

5. The system of claim 1, wherein the at least three clusters include a first cluster for authorized devices, a second cluster for unauthorized devices, and a third cluster for unauthorized devices.

6. The system of claim 5, wherein the non-transitory computer-readable memory further comprises instructions that are executable by the processor for causing the processor to:

determine that the source of the current login attempt is an authorized device based on the clustering algorithm classifying the source of the current login attempt as belonging to the first cluster.

7. A method comprising:

inputting, by one or more processors into a trained machine learning model, current user activity observations associated with a current login attempt to a user account, wherein the trained machine learning model comprises a principal component analysis algorithm;

receiving, by the one or more processors and from the trained machine learning model, one or more distinguishing factors for the current login attempt, wherein the principal component analysis algorithm is configured to determine the one or more distinguishing factors based on variance within the current user activity observations;

providing, by the one or more processors, values of the one or more distinguishing factors as input to a clustering algorithm that is separate from the trained machine learning model, wherein the clustering algorithm is configured to generate an output classifying a source of the current login attempt into one of at least three clusters based on the input, and wherein each cluster of the at least three clusters indicates a different source than other clusters in the at least three clusters;

receiving, by the one or more processors and from the clustering algorithm, the output indicating a classification of the source of the current login attempt into a particular cluster of the at least three clusters;

determining, by the one or more processors and from among a plurality of authentication levels, an authentication level to assign to the current login attempt based on the classification of the source of the current login attempt into the particular cluster, wherein each authentication level of the plurality of authentication levels is associated with a respective cluster of the at least three clusters, and wherein each authentication level of the plurality of authentication levels confers a respective level of access to the user account that is different than other authentication levels of the plurality of authentication levels; and re-training, by the one or more processors, the trained machine learning model using the output classification of the source of the current login attempt, the authentication level for the current login attempt, and the current user activity observations.

8. The method of claim 7, wherein the current user activity observations comprise one or more of input location data, input time data, input velocity, input acceleration, input movement frequency, login attempt duration, number of login attempts, and IP address.

9. The method of claim 7, wherein the current user activity observations comprise heat maps of input location data and keystroke logs for keyboard input.

10. The method of claim 7, further comprising:

limiting access to at least one function of the user account based on the authentication level.

11. The method of claim 7, wherein the at least three clusters include a first cluster for authorized devices, a second cluster for unauthorized devices, and a third cluster for authorized third party devices.

12. The method of claim 11, further comprising:

determining that the source of the current login attempt is an authorized device based on the clustering algorithm classifying the source of the current login attempt as belonging to the first cluster.

13. A non-transitory computer-readable medium comprising program code that is executable by a processor for causing the processor to:

input, into a trained machine learning model, current user activity observations associated with a current login attempt to a user account, wherein the trained machine learning model comprises a principal component analysis algorithm;

receive, from the trained machine learning model, one or more distinguishing factors for the current login attempt, wherein the principal component analysis algorithm is configured to determine the one or more distinguishing factors based on variance within the current user activity observations;

provide values of the one or more distinguishing factors as input to a clustering algorithm that is separate from the trained machine learning model, wherein the clustering algorithm is configured to generate an output classifying a source of the current login attempt into one of at least three clusters based on the input, and wherein each cluster of the at least three clusters indicates a different source than other clusters in the at least three clusters;

receive, from the clustering algorithm, the output indicating a classification of the source of the current login attempt into a particular cluster of the at least three clusters;

determine, from among a plurality of authentication levels, an authentication level to assign to the current login attempt based on the classification of the source of the current login attempt into the particular cluster, wherein each authentication level of the plurality of authentication levels is associated with a respective cluster of the at least three clusters, and wherein each authentication level of the plurality of authentication levels confers a respective level of access to the user account that is different than other authentication levels of the plurality of authentication levels; and re-train the trained machine learning model using the output classification of the source of the current login attempt, the authentication level for the current login attempt, and the current user activity observations.

14. The non-transitory computer-readable medium of claim 13, wherein the current user activity observations comprise one or more of input location data, input time data, input velocity, input acceleration, input movement frequency, login attempt duration, number of login attempts, and IP address.

15. The non-transitory computer-readable medium of claim 13, wherein the current user activity observations comprise heat maps of input location data and keystroke logs for keyboard input.

16. The non-transitory computer-readable medium of claim 13, further comprising program code that is executable by the processor for causing the processor to:
    limit access to at least one function of the user account based on the authentication level.

17. The non-transitory computer-readable medium of claim 13, wherein the at least three clusters include a first cluster for authorized devices, a second cluster for unauthorized devices, and a third cluster for unauthorized devices.

18. The non-transitory computer-readable medium of claim 17, further comprising program code that is executable by the processor for causing the processor to:
    determine that the source of the current login attempt is an authorized device based on the clustering algorithm classifying the source of the current login attempt as belonging to the first cluster.

\* \* \* \* \*